UNITED STATES PATENT OFFICE.

JOHANNES M. KESSLER, OF WEST ORANGE, NEW JERSEY, ASSIGNOR TO E. I. DU PONT DE NEMOURS & COMPANY, OF WILMINGTON, DELAWARE, A CORPORATION OF DELAWARE.

CELLULOSE-ESTER PLASTIC.

1,408,095.  Specification of Letters Patent.  Patented Feb. 28, 1922.

No Drawing.   Application filed November 26, 1919.  Serial No. 340,929.

*To all whom it may concern:*

Be it known that I, JOHNANNES M. KESSLER, a citizen of the United States, and a resident of West Orange, in the county of Essex and State of New Jersey, have invented certain new and useful Cellulose-Ester Plastics, of which the following is a specification.

This invention relates to cellulose ester plastics, and comprises compositions containing as the essential constituents a cellulose ester, for example cellulose acetate or cellulose nitrate, and an ester of an acyloxy derivative of an aromatic acid as a softener.

One object of the present invention is to provide a composition which may be made into strong and flexible sheets and films that are practically unaffected by water, and that are able to withstand the action of sunlight and air for long periods without appreciable deterioration. Other objects will be apparent from the following description.

A factor of great importance in the manufacture of pyroxylin plastics is the substance used as the softening or conditioning agent for the cellulose ester. Although the patent literature discloses a very large number of substances as substitutes for camphor, only a small number have found practical application. Only a few of these substances show any superiority over camphor, and in these cases the difference is usually insufficient to make up for their much higher cost. About the only one at present available in this country is triphenylphosphate which is employed to a limited extent in the nitrocellulose plastic industry, and then only in connection with camphor.

The scarcity and high cost of camphor has led me to investigate the suitability of various substances as camphor substitutes which have not heretofore been suggested for this purpose; as a result of this investigation I have discovered that cellulose ester sheets and films having excellent physical and chemical properties from the standpoint of their use in the arts may be obtained by using as a softener any one of several classes of substances which may be produced from available raw materials at a reasonably low cost.

One of these classes of substances which I have found to be suitable as camphor substitutes, and to which, in combination with a cellulose ester, the present application is directed, comprises the esters of acyloxy-carbocyclic acids, as for example the alkyl or aryl esters of acyloxybenzoic or acyloxynaphthoic acids. Of this class of substances the species which are most readily obtainable are the salicylic acid derivatives, and particularly the acetyl and benzoyl derivatives of the methyl, ethyl, and butyl salicylates.

Some of the valuable properties which these acetylsalicylates have are non-volatility at ordinary working temperatures, high stability and practical insolubility in water. The very pronounced odor of the non-acetylated esters of salicylic acid and the discoloration produced in transparent or delicately colored cellulose ester compounds containing them, make their application as solvents for pyroxylin prohibitive. By introducing an acyl group such as an acetyl group in place of the free hydroxyl group of these compounds, the objectionable features just mentioned are overcome, and the colloiding power is increased at the same time, as has been proved by numerous tests. Compositions containing nitrocellulose or cellulose acetate and any one of these acetylated salicylic acid esters and produced by the same well known process that is in use for the manufacture of cellulose nitrate plastics, such as pyralin, celluloid, etc. give highly satisfactory results when tested for stability to light and heat, flexibility, moldability and tensile strength.

In general the methods which may be used in preparing some of the new camphor substitutes are as follows:—

The methyl acetyl-salicylate, also known in pharmacy as methyl aspirin, may be prepared by the acetylation with acetic anhydride of commercial methyl salicylate. In order to obtain the next higher homologue ethyl salicylate was prepared by the esterification of an ethyl alcohol solution of salicylic acid with gaseous hydrochloric acid as catalyzer and afterwards acetylated in the usual way. Butyl-acetyl-salicylate was obtained in a similar manner by using butyl alcohol in place of the ethyl alcohol. All these materials were finally refined by rectification in vacuum. The methyl derivative is a solid with a melting point of 49° to 50° C. while the ethyl and butyl compounds are liquids at ordinary temperatures.

The mode of preparing the new cellulose ester compositions may be illustrated by the following examples:—

1. 100 parts of pyroxylin, preferably anhydrous, are kneaded with 30 parts of methyl acetyl-salicylate and 72 parts of denatured alcohol at a temperature of from about 40 to 55° C. until the nitrocellulose is properly colloided, after which it is put on rolls and through the different operations such as rolling, cake pressing, sheeting and seasoning which are well known in the manufacture of cellulose nitrate plastics such as pyralin, celluloid, etc. Suitable amounts of stabilizer, for example, urea, and of pigments and colors may be added either during the mixing or the rolling operation.

2. Instead of 100 parts as specified in the above example, I may use more or less of the pyroxylin, as, for example, 90 parts or 105 parts. If a certain amount of camphor is used the amount of acetyl-salicylate for proper colloiding may of course be correspondingly decreased. A part of the acyl-salicylate may be substituted by other softeners such as triphenylphosphate.

3. For producing an inflammable substitute for transparent nitrocellulose plastics (films, etc.) the following composition is particularly suitable:

| | | |
|---|---|---|
| Cellulose acetate | 75. | parts |
| Triphenyl phosphate | 9. | " |
| Urea | 0.75 | " |
| Methyl acetyl-salicylate | 15.25 | " |

The colloiding of the cellulose acetate may be carried out in the same manner as described in Example 1.

Liquid coating compositions may be made by using larger amounts of solvents than specified in Example 1. Suitable solvents are acetone, or methyl alcohol mixed with ethyl acetate and amyl acetate, or a mixture of acetone and methyl alcohol.

As examples of other acylsalicylates which may be suitable as softeners according to my invention, there may be mentioned:—

Phenyl acetylsalicylate (melting point 98° C.)

Alpha naphthyl acetylsalicylate (melting point 91° C.)

Beta naphthyl acetylsalicylate (melting point 136° C.)

The above mentioned methyl acetylsalicylate has a melting point of 49° C., and the ethyl ester a boiling point of 272° C.

Instead of the acetyl derivatives of the hydroxycarbocyclic acid esters, I may use the formyl, propionyl, or benzoyl derivatives, although as a rule these latter have no advantages over the acetyl derivatives, and are more expensive.

Sheets of my new composition are easily made by cutting a slab of the plastic mass produced as in Example 1 above; or if desired a viscous solution is prepared by using a larger amount of solvent, and the solution flowed to form a sheet or film.

I claim:—

1. A composition consisting essentially of a cellulose ester and a softener comprising an alkyl ester of an acyloxycarbocyclic acid.

2. A composition comprising a cellulose ester, an ester of an acyloxycarbocyclic acid and a solvent therefor comprising an alcohol and an alkyl acetate.

3. A composition comprising a cellulose ester and an alkyl ester of an acyloxycarbocyclic acid.

4. A composition comprising a cellulose ester and a methyl ester of an acyloxycarbocyclic acid.

5. A composition comprising a cellulose ester and an alkyl ester of acetylsalicyclic acid.

6. A composition comprising a cellulose nitrate, an ester of an acyloxycarbocyclic acid, and a solvent therefor comprising an alcohol and an alkyl acetate.

7. A composition comprising a cellulose nitrate and an alkyl ester of an acyloxycarbocyclic acid.

8. A composition comprising a cellulose nitrate and a methyl ester of an acyloxycarbocyclic acid.

9. A composition comprising a cellulose nitrate and an alkyl ester of acetylsalicylic acid.

10. A composition containing 7 parts of a softener comprising an alkyl ester of acetyl-salicylic acid and from about 20 to 24 parts of cellulose nitrate.

11. A composition comprising 7 parts of methyl acetylsalicylate and from about 20 to 24 parts of cellulose nitrate.

12. A composition comprising 7 parts of methyl acetylsalicylate and from about 20 to 24 parts of cellulose nitrate and a solvent for said substances.

13. A composition comprising 7 parts of methyl acetylsalicylate and from about 20 to 24 parts of cellulose nitrate and a solvent for said substances comprising an alcohol and an alkyl acetate.

In testimony whereof I affix my signature.

JOHANNES M. KESSLER.